Oct. 10, 1933.  J. M. SPITZGLASS  1,930,113
PRESSURE MEASURING INSTRUMENT
Original Filed July 11, 1927
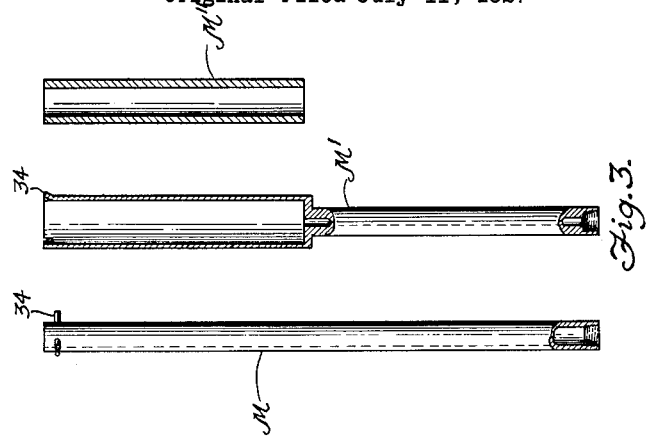
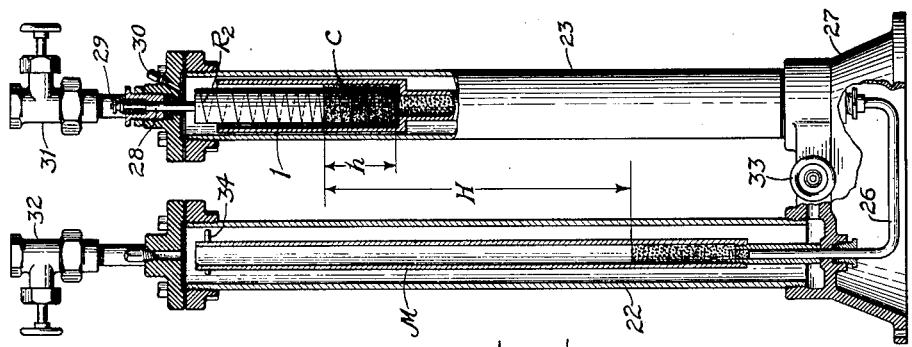
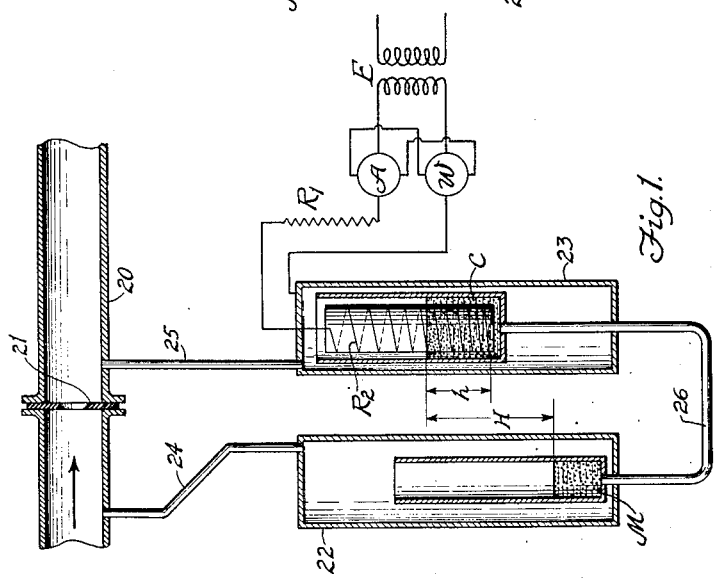
Inventor
Jacob M. Spitzglass
by James B. Lewis
Attorney Patented Oct. 10, 1933

1,930,113

UNITED STATES PATENT OFFICE 1,930,113

PRESSURE MEASURING INSTRUMENT

Jacob M. Spitzglass, Chicago, Ill., assignor to Republic Flow Meters Company, Chicago, Ill., a corporation of Illinois Original application July 11, 1927, Serial No. 204,689. Divided and this application November 19, 1931. Serial No. 576,030

8 Claims. (Cl. 73—31)

This invention relates to pressure actuated measuring instruments such as flow meters.

This application is a division of my co-pending application, Serial No. 204,689, filed July 11th, 1927, and relates especially to the apparatus shown in said pending application.

The general purpose of the present invention is the provision of an improved flow meter capable of general application.

A further object is to provide an instrument actuated by differential pressure having a balanced liquid column subjected to differential pressures only and not to total pressures.

Other objects and advantages will appear from the following description.

The invention is exemplified in the combination and arrangement of parts shown in the accompanying drawing and described in the following specification, and it is more particularly pointed out in the appended claims.

In the drawing:—

Fig. 1 is a diagrammatic sectional view illustrating one embodiment of the present invention;

Fig. 2 is an elevation with parts in section showing a flow meter body having the present invention applied thereto;

Fig. 3 is an elevation of chamber M and variations thereof, with parts in section, illustrating the principle of the invention.

In Fig. 1 of the drawing, the numeral 20 designates a conduit for the flow of fluid having an orifice plate 21 disposed therein for producing differential pressure incident to the flow of fluid in the conduit. Closed body members 22 and 23 are connected by tubes 24 and 25 respectively with the conduit 20 at the opposite sides of the orifice plate 21. The body member 22 is connected at the high pressure side and the body member 23 at the low pressure side of the orifice plate. A member M, open at its top forms a chamber within the body member 22 and a similar member C forms a chamber within the body member 23. The two chambers M and C are connected by a U-tube 26. The members M and C and the U-tube are partially filled with mercury. It will be apparent that the legs of the mercury column will be subjected to the different pressure at the opposite sides of the orifice plate 21, so that the mercury will rise in the member C to a height H above the mercury level in the member M the distance H being dependent upon the differential pressure produced in the conduit. The exteriors of the chambers M and C will be subjected to the same pressures as the interiors except for the effect of the mercury columns within the members M and C. That is, the joints between the members M and C and the U-tube 26, are not subjected to the full pressure in the conduit 20 so that the danger of leakage of the mercury is a minimum.

A cylinder 1, of insulating material is disposed within the chamber C and a resistance $R_2$ is wound upon the cylinder 1 and forms a part of an electric circuit supplied with electro-motive force from the transformer E and having an external resistance $R_1$ therein. It will be apparent that the resistance $R_2$ will be changed by the height of the mercury in the resistance chamber C.

As explained in my prior Patent No. 1,325,763, the height of a liquid column balancing a differential pressure produced by flow of fluid in a conduit is proportional to the square of the velocity of the flow of fluid in the conduit. It follows therefore that to make an electrical current proportional to the flow of fluid passing thru the conduit it is only necessary that the current shall be proportional to the square root of the height of the liquid column balancing the velocity pressure or pressure difference created by the flow. It is desirable therefore to wind the resistance wire $R_2$ upon the cylinder 1 in such way that the conductance of the electric circuit will be varied continuously by the rise and fall of the mercury level in the resistance chamber C and at all times will be proportional to the square root of the height of the mercury $h$ in the resistance chamber C. The relation of the various quantities involved and the mechanism for laying the wire upon the cylinder 1, are fully explained in my aforesaid copending application.

In Fig. 2 there is shown the meter body of a flow meter constructed according to the present invention. The meter body comprises a base member 27, on which the body tubes 22 and 23 are mounted and in which the chamber tubes M and C are disposed, the tubes M and C being connected by the U-tube 26. The cylinder 1 is supported within the body tube 23, by an insulated rod 28 thru which the resistance wire $R_2$ extends to a terminal 29. A second terminal 30 is provided on the body member 23 thru which the circuit is completed to the mercury within the resistance chamber C. Valves 31 and 32 are provided for connecting the body members 22 and 23 with the conduit 20. A valve 33 is provided for relieving the pressure between the body members 22 and 23 if required.

The principle of operation is demonstrated diagrammatically in Fig. 1. The U-tube partly filled with mercury is made to balance the differential pressure of the flow in the pipe by the corresponding rise of mercury in the low pressure side of the tube. The mercury column forms a part of the electric circuit as shown in the diagram.

The electric circuit contains a fixed external resistance $R_1$ in series with a variable internal resistance $R_2$, an electro-motive force E, a conductance indicator A, a conductance integrator or "Mho" meter W. The variable resistance $R_2$ is placed in the contact chamber C which forms the low pressure side of the U-tube. The rise and fall of the mercury column, produced by the variation of the flow in the pipe, varies the amount of resistance and the corresponding amount of electric conductance in the circuit.

It can be seen from Fig. 1 that the effective height $h$, that is, the rise of mercury in the low pressure side of the U-tube, has a definite relation to the total differential "H". This relation is determined by the relative size of the legs of the U-tube and may be expressed by the equation:

$$h = \frac{a_1}{a_1 + a_2} H$$

where:

H = the height of the mercury column balancing the pressure difference of the flow.

$h$ = the rise of mercury in low pressure tube for a given pressure difference.

$a_1$ = the net mercury section in the chamber M.

$a_2$ = the net mercury section in the chamber C.

Applying this principle to Fig. 2, it will be seen that the pressure differential, represented by the height H, necessary to produce a rise of mercury in chamber C, equal to height $h$ is much greater than that required to produce a similar rise or height $h$ in Fig. 1, because the relative size of the legs of the U-tube has been varied.

From the foregoing, it will be evident that the range of the meter may be changed, without changing the maximum rise of mercury or height $h$ necessary for a full scale deflection of the indicating instrument, by varying the size of the legs of the U-tube. The change may be and is preferably effected by changing the size of the chamber M relative to the chamber C, although it is understood that either one or both of the chambers may be varied if desired. As illustrated in Fig. 3, the chamber M may be uniform in cross-section or it may have an enlarged portion M', the capacity of which may be further varied by a displacer M" adapted to fit into said enlargement. Other forms of the chamber will suggest themselves to those skilled in the art, as those shown are only illustrative. To permit the ready removal or interchange of the chambers they are preferably threaded so that they may be detachably connected to the U-tube 26.

The chambers are maintained in correct position by spacer pins 34 which engage the sides of the member 22. These pins prevent the chamber from leaning to one side under the weight of the mercury therein and thus relieve the screw threaded connections of lateral strain.

Having thus described my invention what I claim is:

1. A measuring instrument comprising a pair of closed casings, a U-tube having the ends thereof disposed in said casings and opening into said casings, the portions of said U-tube in said casings having joints therein, and means for subjecting the interior of said casings to different pressures.

2. A meter body including a pair of closed casings, a U-tube having its ends opening into said casings, respectively, the portions of said U-tube in said casings including chambers detachably connected to said tube and means for subjecting the interior of said casings to different pressures.

3. A meter housing including a pair of closed casings, an open topped chamber in each of said casings, means providing communication between said chambers and constituting therewith a U-tube adapted to contain a liquid, and connections from said casings, respectively, whereby the interiors of said casings and chambers may be subjected to different pressures.

4. A meter housing including a pair of closed casings, a U-tube, the legs of which are enlarged for a substantial portion thereof, and said enlarged portions being detachably connected to the smaller portion, said enlarged portions and a part of the smaller portion being disposed in the casings respectively and means for subjecting the interior of said casings to different pressures.

5. A flow measuring instrument comprising a pair of elongated chambers, a connection between said chambers, said chambers and connection forming a U-tube adapted to contain a liquid, and at least one of said chambers being detachably connected to said connection, casings enclosing the chambers and a portion of the connection, an indicating circuit including an element located in one of said chambers and pressure connections from said casings, whereby the interiors thereof may be subjected to different pressures.

6. A meter housing including a pair of closed casings, a U-tube comprising a plurality of sections detachably connected together and containing a conducting liquid, said sectional parts of the U-tube enclosed in said casings at the points of connection, means for introducing fluid under pressure into said casings so that the interior and exterior portions of said U-tube are exposed to said pressures and an indicating circuit including an element in said U-tube, the resistance of which is varied by rise and fall of the conducting liquid for indicating variations in the quantity to be measured.

7. A measuring instrument, comprising a sectional U-tube adapted to contain a liquid, the sectional portions of said U-tube being detachably connected together, a casing inclosing said sectional portions of the U-tube at all points of detachable connection, connections to the respective casings for introducing fluid under pressure so as to exert approximately the same pressure against both sides of the joints between said sectional portions and means for indicating variations in height of said liquid.

8. A pressure actuated instrument comprising a mercury containing U-tube having detachably connected enlarged portions at each end thereof, casings enclosing said enlarged portions and containing fluids under pressure, whereby the connecting joint between said enlarged portion and said U-tube is subjected on one side to said fluid pressure and on the other side to a pressure equal to said fluid pressure plus the differential weight of the mercury column above that of the fluid column, acting on said joint.

JACOB M. SPITZGLASS.